United States Patent [19]
Paradise

[11] Patent Number: 5,655,348
[45] Date of Patent: Aug. 12, 1997

[54] DOOR CLIP

[75] Inventor: Bruce D. Paradise, Farmington, Conn.

[73] Assignee: The Stanley Works, New Britain, Conn.

[21] Appl. No.: 631,467

[22] Filed: Apr. 12, 1996

[51] Int. Cl.[6] .................................................. E04C 2/38
[52] U.S. Cl. .................. 52/656.4; 52/656.7; 52/656.9; 403/231; 403/403
[58] Field of Search ................. 52/656.4, 656.5, 52/656.6, 656.7, 656.9; 403/231, 403, 258, 256

[56] References Cited

U.S. PATENT DOCUMENTS

| 1,961,006 | 5/1934 | Marty | 52/656.4 X |
|---|---|---|---|
| 3,375,030 | 3/1968 | Thompson | 403/231 |
| 3,734,550 | 5/1973 | Vance | 403/256 X |
| 3,744,827 | 7/1973 | Cox | 52/656.4 X |
| 3,772,837 | 11/1973 | Hunt | 52/656.4 X |
| 4,193,500 | 3/1980 | Scott | 52/656.4 X |
| 4,456,299 | 6/1984 | Steinmetz | 403/231 X |
| 4,611,947 | 9/1986 | Baus | 403/403 X |
| 4,614,068 | 9/1986 | Bergthold | 52/656.4 X |
| 4,747,248 | 5/1988 | Fahs | 52/656.7 X |
| 4,802,319 | 2/1989 | Lafleur | 52/656.4 X |

FOREIGN PATENT DOCUMENTS

| 2448065 | 10/1980 | France | 403/258 |
|---|---|---|---|
| 2900173 | 7/1980 | Germany | 52/656.4 |
| 2022757 | 12/1979 | United Kingdom | 52/656.4 |

Primary Examiner—Wynn E. Wood
Assistant Examiner—Aimee E. McTigue
Attorney, Agent, or Firm—Chilton, Alix & Van Kirk

[57] ABSTRACT

A door clip for mounting a door rail to a door stile has a base and pair of rail support arms extending perpendicularly from the base. Each arm defines a generally planar surface portion which contacts the interior surfaces of the side walls of the door rail. Fasteners extend through bores in the base and secure to a mounting plate positioned in the door stile. Each rail support arm defines a longitudinally oriented channel. Rail mounting fasteners extend through the door rail and into the channels.

21 Claims, 3 Drawing Sheets

DOOR CLIP

BACKGROUND OF THE INVENTION

This invention relates generally to the field of door construction. More specifically, this invention relates to doors which are constructed from metal rails and stiles.

It is well-known in door construction technology to construct doors from various combinations of door rails and door stiles made of extruded metal. Typically, a pair of spaced vertical stiles form the leading and trailing edges of the door. Two or more horizontal rails extend between the stiles to complete the principal structural elements of the door. The generally rectangular frames defined by the rails and stiles receive panels of materials such as glass to complete construction of the door.

The joining of a vertical stile and a horizontal rail must address several inherent structural and operational problems. In particular, over time, doors are subject to racking due to different portions of the door being subjected to unequal force distributions. These force distributions can arise from the door being typically supported from one stile hinged to a door frame while the remainder of the door extends outwardly to the leading or front stile in a suspended relationship. Additionally, unequal force distributions from the door operation can cause the generally planar door to twist. The vertical and horizontal orientation of the constituent stiles and rails effectively limits the amount of diagonal cross bracing that can be constructed into the door to resist racking and twisting. Furthermore, multi-pane glass panels can add significant weight to the door. The additional weight continuously places increased forces on the door thereby further increasing the tendency of the door to rack and twist.

Naturally, it is highly desirable that the assemblies for connecting the rails and stiles have sufficient mechanical integrity to limit racking and twisting of the door during operation. Furthermore, it is advantageous that rails and stiles be joined in an efficient and inexpensive configuration that does not add significant additional weight to the door.

A conventional method of affixing rails to stiles involves passing a threaded rod between the outside stiles and through the central cavity of a rail of the door. A threaded support rod is used for each rail of the door. Threaded nuts on each end of the threaded rod are tightened to draw the stiles toward each other and support the rail therebetween.

Threaded support rods have proved advantageous, but they have also exhibited certain detrimental characteristics. The support rods may loosen over time and the integrity of the joining structures is subject to expansion and contraction of the constituent components including the rails and stiles. Due to the large variety of sizes of door openings, doors of multiple widths must be constructed. Support rods of different lengths are then required for each different door width. The support rod adds additional weight to the door as the door width increases, further multiplying the stresses on the door. Generally, the edges of the stile must be open or have channels in order to facilitate access to the threaded nuts to allow tightening. For aesthetic reasons, an additional door edge piece is frequently used to cover the open edge and conceal the threaded nuts.

In another type of door construction, a clip having horizontal flanges is bolted to the door stile. The door rail is then placed over the clip and welded to the flanges. A deficiency of such a construction is that the rail cannot easily be removed from the clip or stile for repair of damaged components, and therefore the useful life of the entire door structure may be unnecessarily limited.

SUMMARY OF THE INVENTION

Briefly stated, the invention in a preferred form is a door clip for mounting a door rail to a door stile. The door clip is an extruded member having a base mountable to an upright end wall of a door stile. Self-tapping screws extend through mounting openings in the base and aligned openings in the door stile. The mounting screws threadably engage a mounting plate located inside the door stile to support the door clip to the wall of the stile. The base includes a pair of locating strips which mate with recesses in the end wall of the stile.

A pair of transversely spaced rail support arms extends perpendicularly from the base, and each arm defines a generally vertically oriented planar exterior surface. The exterior surfaces are parallel to each other and closely engage the interior walls of the door rail. Transversely protruding locating shoulders on the support arms facilitate the engagement between the support arms and the interior surfaces of the rails. The door clip further defines rail mounting channels oriented generally parallel to the longitudinal axis of the door clip. Self-tapping screws pass through openings in the rail and threadably engage the rail mounting channels to support and secure the rail to the door clip and, therefore, to the stile.

The door clip of the invention is constructed from a rigid, unitary metal extrusion which defines the base, the rail support arms and the rail mounting channels. Door clips which are individually dimensioned for a given rail are efficiently and simply manufactured from the same reference clip extrusion. A door clip blank of the desired height is cut from the clip extrusion along a plane generally perpendicular to the longitudinal axis of the clip extrusion. Additional finishing of the edges of the door clip blank may be eliminated by the use of a cutting apparatus that produces a sufficiently smooth cut. Mounting openings are drilled in the base portion of the door clip blank to produce the door clip of the invention. No additional machining steps are generally required in order to further finish the door clip before use. Therefore, door clips for a wide range of rail dimensions can be constructed in a generally simplified manufacturing process from a single reference clip extrusion.

Furthermore, the use of self-tapping removable screws for mounting the door clip to the door stile and the door rail to the door clip obviates the need for threaded nuts and/or washers which are required in related door constructions. Self-tapping screws can be readily removed from the door clip in order to separate the rails and stiles of the door and replace damaged components or modify the door. The door clip can be employed in the construction of doors of varying widths without requiring an inventory of door clips for each particular door width since the door clip engages only the end portion of the rail. The configuration and orientation of the rail support arms further provide a strong mechanical structure which is resistant to racking and twisting.

An object of the invention is to provide a door clip for securely mounting a door rail to a door stile.

Another object of the invention is to provide a door clip for joining a stile to a rail in a configuration which has a high degree of structural integrity.

A yet further object of the invention is to provide a door clip which may be installed to securely join a stile and a rail in an efficient and inexpensive manner.

A further object of the invention is to provide a door clip which may be manufactured in an efficient and inexpensive manner.

These and other objects of the invention will be readily apparent from the specification and the drawings.

DETAILED DESCRIPTION OF THE PREFERRED EMBODIMENT

Figure 1:
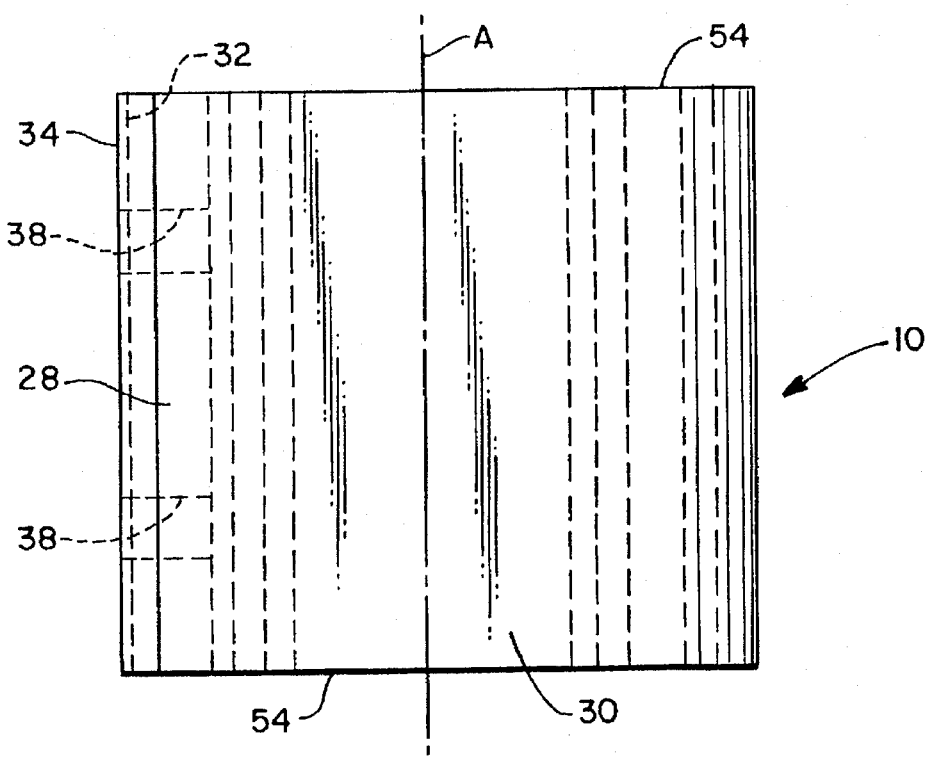
FIG. 1 is a side elevational view, partially in phantom, of the door clip of FIG. 1.
Figure 2:
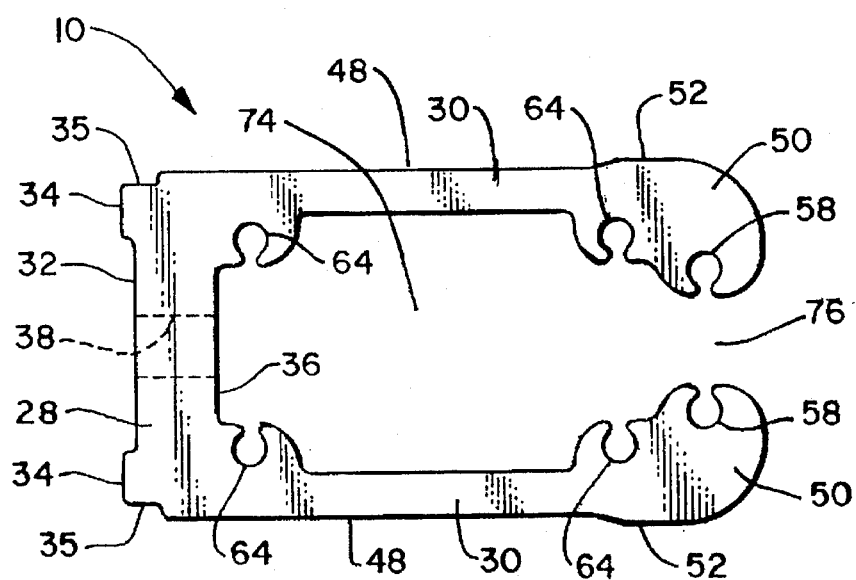
FIG. 2 is a top plan view, partially in phantom, of the door clip of FIG. 1.
Figure 3:
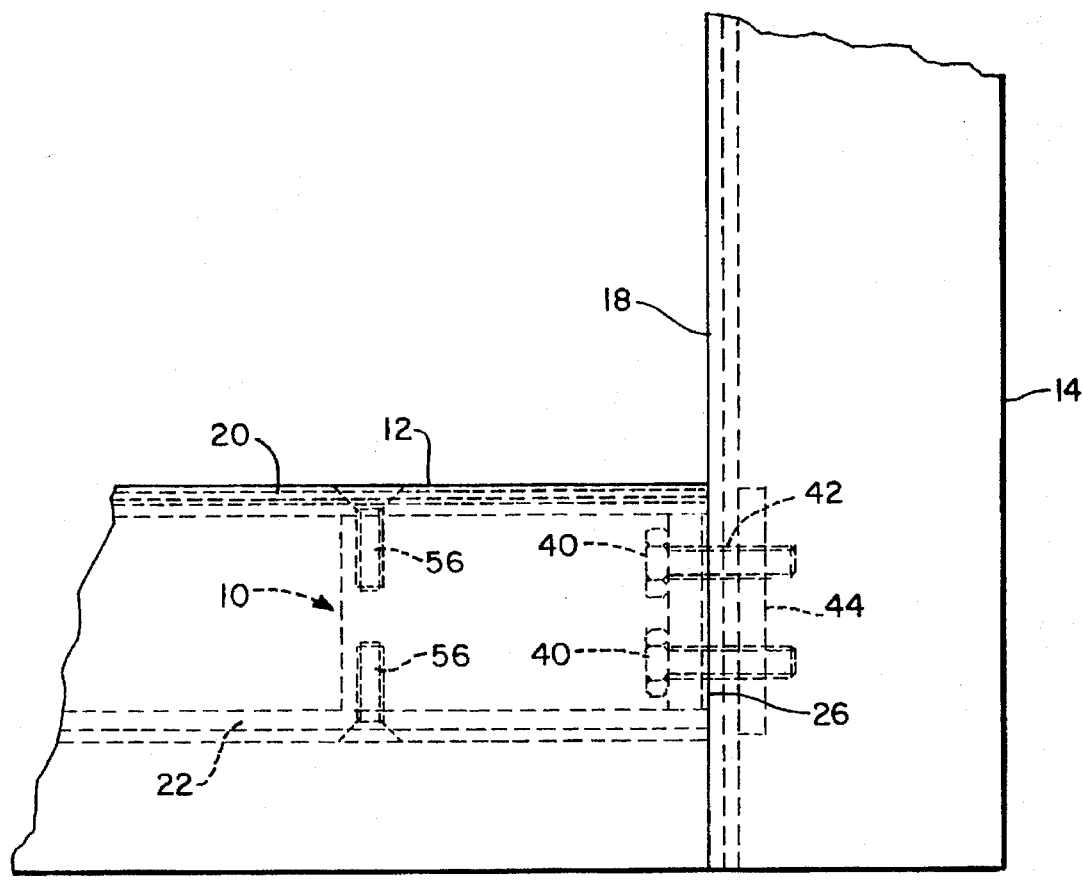
FIG. 3 is a side view, partially in phantom and partially broken away, of the door clip of FIG. 1 mounted to a door rail and a door stile.
Figure 4:
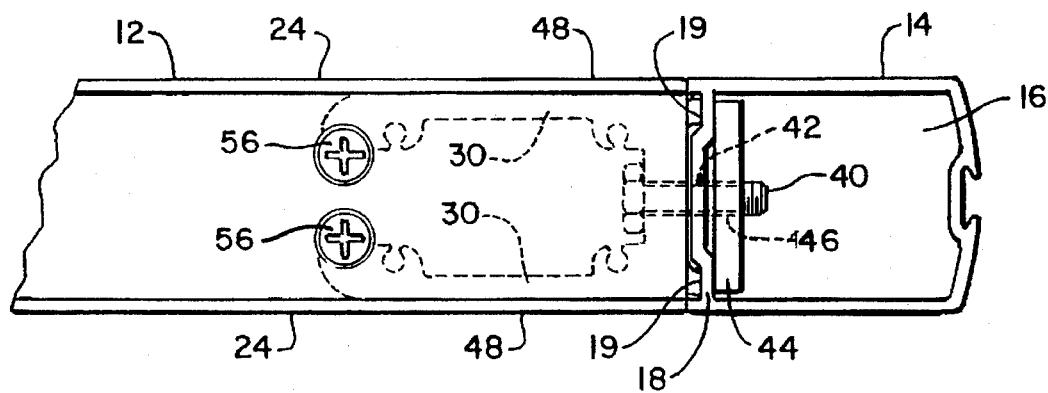
FIG. 4 is a bottom view, partially in phantom and partially broken away, of the door clip, door rail and door stile of FIG. 3.

With reference to the drawings wherein like numerals represent like components throughout the figures, a door clip in accordance with the invention is generally designated by the numeral 10. The clip 10 has particular applicability in the construction of doors assembled from metal components. The door clip 10 is preferably an extruded lightweight aluminum member. The door clip 10 functions to join a horizontal door rail 12 to a vertical door stile 14. Naturally, several clips are employed in a given door construction.

For the illustrated application, the door stile 14 is generally a lightweight metal extrusion of aluminum defining a stile internal cavity 16. The door stile 14 has an upright recessed engagement end wall 18 which supports one or more vertically spaced door clips 10. The end wall 18 may form a pair of transversely spaced recesses 19. The rail 12 is a tubular metal extrusion having a generally rectangular cross-section defined by an upper wall 20 and an oppositely disposed lower wall 22. Oppositely disposed side walls 24 connect at right angles to the upper wall 20 and the lower wall 22. The upper wall 20, the lower wall 22 and side walls 24 of the rail 12 define a socket-like opening 26 at each end.

The door clip 10 has a base 28 which is dimensioned and configured for mounting the door clip 10 to the engagement wall 18 of the door stile 14. The base 28 has a generally planar exterior surface 32 for surface-to-surface contact with the medial portion of engagement wall 18 of the stile 14, and an interior surface 36 generally parallel to the exterior surface 32. Elongated locating strips 34 project from the exterior surface 32 for mating in the recesses 19 of the engagement wall 18 to transversely and rotatably fix the base relative to the stile. The base also forms a pair of transversely spaced outer notches 35 to facilitate engagement with the recessed end configuration of the stile. A pair of mounting bores 38 extend between the interior surface 36 and the exterior surface 32. A pair of hex head self-threading screws 40 project through the mounting bores 38 and a pair of matching mounting openings 42 in the engagement wall 18 of the door stile 14. The head portions of the screws 40 engage against the interior surface 36 of the base 28. The shank portions of the screws 40 threadably engage a mounting plate 44 positioned in the stile cavity 16 against the engagement wall 18 to mount the door clip 10 to the door stile 14. The mounting plate 44 preferably defines plate openings 46 of sufficient size to allow the screws 40 to self-thread into the mounting plate 44. Therefore, additional fastening hardware, such as threaded nuts and washers, is not required.

A pair of rail support arms 30 extends laterally from the base 28. The rail support arms 30 are generally perpendicular to the interior and exterior surfaces 32, 36 of the base. Each rail support arm 30 defines a generally planar exterior surface 48 for surface-to-surface contact with the interior surface 25 of the rail side walls 24. The exterior surfaces 48 are preferably parallel to each other and perpendicular to the base 28. The rail support arms 30 are preferably vertically oriented to provide maximum mechanical strength to resist racking of the door. Each rail support arm 30 terminates in a rounded tapered end portion 50. The end portions 50 are preferably curved toward the oppositely positioned rail support arm 30 to allow easier insertion of the door clip 10 into the rail opening 26.

Longitudinally extending contoured locating shoulders 52 protrude slightly in a transverse direction relative to the planar exterior surfaces 48 of the rail support arms 30. The small locating shoulders 52 cooperate to center the door clip in the rail opening 26. The locating shoulders 52 are preferably located near the end portions 50 of the locating arms 30, and the exterior transverse spacing is preferably slightly greater than the transverse spacing between the rail walls 24. The rail support arms 30 therefore function in a spring-like manner due to the locating shoulders 52 contacting the interior surfaces 25 of the side walls 24 to thereby force the end portions of the rail support arms 30 closer together as the door clip 10 passes into the rail opening 26. The end of the rail thus fits over the support arms 30 in a close fitting sleeve-like fashion.

In one embodiment of the invention wherein the transverse distance, between the planar exterior surfaces 48 of the arms is 1.539 inches, the transverse distance between the exterior surfaces of the locating shoulders 52 is 1.558 inches. In this embodiment, locating shoulders 52 having a transverse dimension of approximately 0.010 inches have been found to produce the desired spring-like function for the rail support arms 30 having an interior transverse spacing of approximately 1.54 inches.

The door clip 10 further defines clip edges 54 generally perpendicular to the exterior surfaces 48 of the rail support arms 30. The edges 54 are uniformly longitudinally (vertically) spaced. The distance between the clip edges 54 defines the height of the door clip 10. The height defined by the clip edges 54 is preferably equivalent to the height of the rail opening 26 between the upper wall 20 and lower wall 22 of the rail 12. The door clip 10 further defines a longitudinal axis A generally parallel to the exterior surfaces 48 and 32 of the door clip 10.

Rail mounting groove-like channels 58 are formed in the door clip 10 for receiving rail mounting fasteners 56 to secure the rail 12 to the door clip 10. The rail mounting fasteners 56 are preferably self-tapping screws counter sunk into the rail 12. The rail mounting channels 58 are semi-enclosed structures having a generally uniform circular interior surface and are oriented to be generally parallel to the longitudinal axis A of the door clip 10. The rail mounting channels 58 have a generally smooth interior surface for threadably receiving the self-tapping rail mounting fasteners 56. The channels 58 may serve to anchor a fastener 56 at each opposing end.

Figure 5:
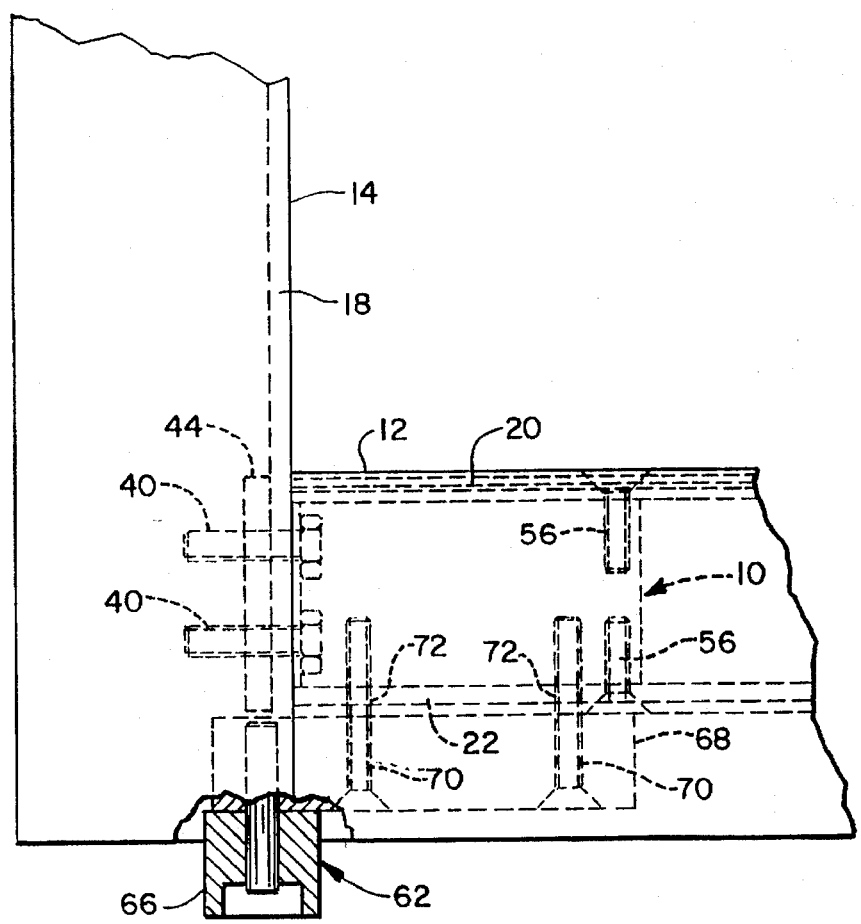
FIG. 5 is a side view, partially in phantom and partially broken away, of the door clip of FIG. 1 mounted to a door rail, a door stile and a roller assembly.
Figure 6:
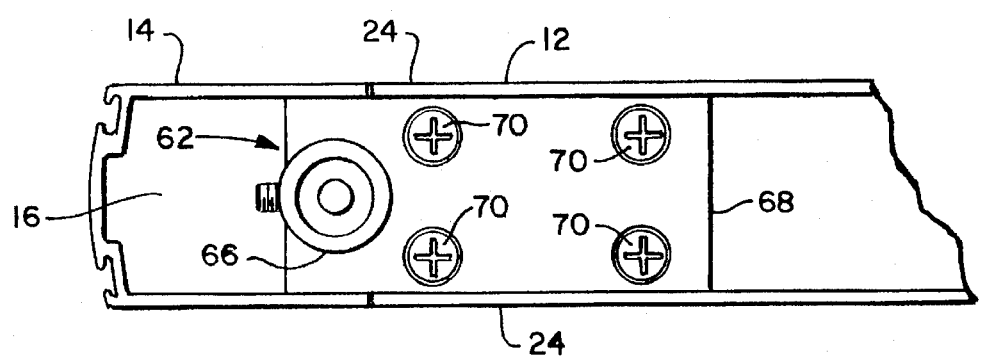
FIG. 6 is a top view of the door clip, door rail, door stile and roller assembly of FIG. 5.

In an alternate door construction illustrated in FIGS. 5 and 6, a pivot or roller assembly or other device can be mounted to the rail of the door. The representative assembly 62 is preferably mounted to the rail of the door. The door clip 10 defines a pair of mounting channels 64 on each rail support arm 30. The mounting channels 64 are smooth walled semi-enclosed structures having a generally circular interior surface and are oriented parallel to the longitudinal axis A of the door clip 10. The assembly 62 has a pivot or roller 66 rotatably mounted to a pivot body 68. In this case, self-threading pivot fasteners 70 extend through the pivot body 68 and through channels 72 in the lower wall 22 of the rail 12. The pivot fasteners 70 threadably engage into the pivot mounting channels 64 to mount the assembly 62 to the lower wall 22 of the rail 12. The mounting channels can also be employed to receive additional rail mounting fasteners 56.

The rail extrusion from which the door clip blanks are produced preferably has no enclosed apertures or tubular portions. Production of enclosed apertures would require a more expensive extrusion process or additional machining of the door clip blank. The interior surfaces 36 of the base and the rail support arms define a recess 74 therebetween, and the end portions of the rail support arms converge inwardly to define a narrow gap 76 therebetween. The rail mounting channels 58 and mounting channels 64 are preferably channels that open into the channel recess 74. Such a configuration facilitates the extruding and manufacturing process. The rail mounting channels and the pivot mounting channels are therefore pre-formed in the extrusion and require no additional machining when the door clip 10 is manufactured from the clip extrusion. The door clip 10 is preferably constructed from a clip extrusion made of a lightweight rigid material such as 6063-T5 aluminum.

An advantage of the door clip extrusion is that a single reference clip extrusion can be used for a variety of rails having different heights. A door clip blank of the required height is cut from the extended reference door clip extrusion. Additional door clip blanks of different heights can be cut from the same reference door clip extrusion. A door clip blank of the required height is cut from the extrusion along a plane generally perpendicular to the longitudinal axis of the clip extrusion. Additional finishing of the edges 54 of the door clip 10 may be eliminated by the use of a cutting apparatus capable of producing a sufficiently fine cut on the end of the clip blank. Each cut produces the edges of two adjacent door clip blanks from the door clip extrusion. Typically, the only additional manufacturing required to be performed on the door clip blank after cutting is drilling the mounting bores 38 in the base 28. The use of self-tapping screws 56, 70 engaging the walls of the rail mounting openings 58 and pivot mounting openings 64 obviates pre-threading the mounting channels 58, 64 which would increase the final manufacturing costs of each door clip 10.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed:

1. A clip for mounting a door rail to a door stile, said door clip comprising:

a base engageable to a stile, said base defining a stile mounting opening; and transversely spaced rail support arms extending laterally from said base in generally perpendicular relation thereto, each said rail support arm defining a planar exterior surface portion, said planar exterior surface portion being generally parallel and defining a clip axis generally parallel to said planar exterior surface portion, each said support arm defining a rail mounting channel parallel to said clip axis, each said support arm further defining a pair of opposed arm edges, said rail mounting channels of each said arm extending from one of said arm edges of one of said support arms to said other arm edge of said same support arm.

2. The door clip of claim 1, wherein each said rail support arm defines a plurality of rail mounting channels parallel to said clip axis.

3. The door clip of claim 2 wherein each said support arm defines two channels which laterally and transversely align with corresponding channels of said other support arm.

4. The door clip of claim 1 wherein said rail mounting channels have smooth inner channel surfaces.

5. The door clip of claim 4 wherein said channels are semi-enclosed and said surfaces are generally circular.

6. The door clip of claim 1, wherein each of said support arms has a tapered end portion.

7. The door clip of claim 1 wherein said base further comprises a pair of transversely spaced locating strips protruding in opposite direction to that of said support arms.

8. The door clip of claim 1 wherein said base and said support arms have a unitary one-piece structure.

9. The door clip of claim 1 wherein said support arms further comprise a transversely protruding contoured locating shoulder.

10. A door assembly comprising:

a stile comprising an end wall defining a pair of transversely spaced recesses, said stile defining a central stile axis;

a tubular door rail comprising four walls defining at one end thereof a rectangular rail socket;

a clip closely received in said rail socket, said clip comprising a base mounted on said door stile end wall, said base comprising a pair of locating strips received in said recesses, a first rail support arm extending from said base, said first rail support arm defining a first exterior arm surface and contacting an interior rail surface of a first rail wall in surface-to-surface relationship, a second rail support arm extending from said base, said second rail support arm having a second exterior arm surface transversely spaced from said first exterior surface and contacting an interior rail surface of a second rail wall in surface-to-surface relationship, each of said rail support arms defining rail mounting channels, said channels extending generally parallel to said stile axis;

stile mounting means for mounting said base to said stile; and rail mounting means for mounting said rail to said rail support arms, said rail mounting means comprising fasteners extending through opposed rail walls and into said rail mounting channels.

11. The door assembly of claim 10 wherein said base defines stile mounting openings and said stile mounting means comprises fasteners extending through said stile mounting openings.

12. The door assembly of claim 10 wherein said fasteners of said rail mounting means comprise self-tapping screws.

13. The door assembly of claim 10 wherein said rail mounting channels are semi-enclosed structures having a circular interior surface.

14. The door assembly of claim 10 wherein each said support arm further comprises transversely protruding locating shoulders.

15. The door assembly of claim 10 wherein each said rail support arm of said clip terminates in a tapered end portion.

16. The door assembly of claim 10 further comprising an assembly having a body, body mounting means for mounting said body on one said rail wall, said door clip defining assembly mounting channels parallel to said stile axis, said body mounting means comprising fasteners extending into said assembly mounting openings.

17. The door assembly of claim 16 wherein said fasteners of said body mounting means are self-tapping screws.

18. An extruded metal door clip comprising:

a base having first and second surfaces, a pair of transversely spaced strips protruding from said first surface and means defining at least one mounting opening;

a pair of transversely spaced rail support arms extending laterally from said second surface, each said rail support arm having opposed edges and having an exterior surface having a generally planar portion, said arm planar portion being generally parallel and perpendicular to said base second surface, each said rail support arm terminating in an arm end portion, said arm end portions defining a gap therebetween, said rail support arms defining laterally aligned rail mounting channels, said rail mounting channels extending between said edges.

19. The clip of claim 18 wherein said arm end portions are rounded.

20. The clip of claim 18 wherein said rail support arms further comprise transversely protruding locating shoulders.

21. The clip of claim 20 wherein each said locating shoulder protrudes about 0.01 inches from the associated planar portion of said arm exterior surface.

* * * * *